United States Patent
Kazda et al.

(10) Patent No.: US 9,075,948 B2
(45) Date of Patent: Jul. 7, 2015

(54) METHOD OF IMPROVING TIMING CRITICAL CELLS FOR PHYSICAL DESIGN IN THE PRESENCE OF LOCAL PLACEMENT CONGESTION

(71) Applicant: International Business Machines Corporation, Armonk, NY (US)

(72) Inventors: Michael A. Kazda, Poughkeepsie, NY (US); Frank J. Musante, Poughkeepsie, NY (US); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/955,244

(22) Filed: Jul. 31, 2013

(65) Prior Publication Data

US 2015/0040095 A1    Feb. 5, 2015

(51) Int. Cl.
*G06F 17/50*    (2006.01)

(52) U.S. Cl.
CPC ........ *G06F 17/5072* (2013.01); *G06F 17/5068* (2013.01)

(58) Field of Classification Search
CPC .................. G06F 17/5072; G06F 17/5068
See application file for complete search history.

(56) References Cited

U.S. PATENT DOCUMENTS

| | | | |
|---|---|---|---|
| 6,470,476 B2 * | 10/2002 | Bednar et al. | 716/113 |
| 6,553,553 B2 * | 4/2003 | Komaki | 716/119 |
| 6,564,361 B1 * | 5/2003 | Zolotykh et al. | 716/135 |
| 6,629,304 B1 * | 9/2003 | Gasanov et al. | 716/122 |
| 7,036,103 B2 * | 4/2006 | Miller et al. | 716/122 |
| 7,089,510 B2 * | 8/2006 | Correale et al. | 716/133 |
| 7,111,266 B2 * | 9/2006 | Correale et al. | 716/113 |
| 7,296,252 B2 * | 11/2007 | Alpert et al. | 716/122 |
| 7,581,201 B2 | 8/2009 | Kazda et al. | |
| 7,590,962 B2 * | 9/2009 | Frenkil et al. | 716/120 |
| 7,624,364 B2 * | 11/2009 | Albrecht et al. | 716/113 |
| 7,653,884 B2 * | 1/2010 | Furnish et al. | 716/103 |
| 7,765,517 B2 * | 7/2010 | Ouali et al. | 716/132 |
| 7,784,006 B1 * | 8/2010 | Duthou et al. | 716/104 |
| 7,805,697 B2 * | 9/2010 | Wood | 716/113 |
| 7,996,812 B2 * | 8/2011 | Kotecha et al. | 716/134 |
| 8,370,786 B1 * | 2/2013 | Burstein | 716/134 |
| 8,527,933 B2 * | 9/2013 | Sharma | 716/132 |
| 2005/0251775 A1 * | 11/2005 | Wood | 716/10 |
| 2007/0300193 A1 * | 12/2007 | Lillis et al. | 716/3 |

OTHER PUBLICATIONS

"FPGA Designers Need ASIC-Style Design Tools", Salil Raje, Oct. 2003; COTS Journal.
"XCell Journal", XILINX, Issue 55; Fourth Quarter 2005.

* cited by examiner

*Primary Examiner* — Naum B Levin
(74) *Attorney, Agent, or Firm* — Ira D. Blecker; H. Daniel Schnurmann (57) ABSTRACT

Optimizing circuits having a congested placement with a timing critical placement map includes identifying critical circuit components in the placement map and determining failing circuit components in the placement map; determining "non-critical" circuit components safe to be moved; removing selected non critical from the placement map; and optimizing the critical circuit components in a new partial placement image of said map; and reinserting the "non -critical" circuit components back into said placement image. The optimization is performed by circuit transformation operating in congested regions of the placement image enabling cell insertion and modifications that increase cell size.

20 Claims, 7 Drawing Sheets

FIG. 1A
(PRIOR ART)

✗ = TARGET LOCATION
'O' = OPTIMIZED CELL

FIG. 1B
(PRIOR ART)

✗ = TARGET LOCATION
'A' = DESIRED CELL SIZE     'O' = OPTIMIZED CELL

METHOD OF IMPROVING TIMING CRITICAL CELLS FOR PHYSICAL DESIGN IN THE PRESENCE OF LOCAL PLACEMENT CONGESTION

FIELD OF THE INVENTION

The present invention relates to a method of enabling the optimization of circuits in a physically blocked or congested placement image while preserving the existing placements of timing critical circuits. More specifically, it is a method of inserting or modifying circuits by inserting at exact placement locations in the presence of interference or congestion.

BACKGROUND

Circuit timing in modern VLSI design is greatly impacted by the placement of circuits within the design image. The relative physical placements impact the wire delays and circuit delays due to changes in length as well as changes in capacitance and resistance between the circuits. It is therefore important to know or estimate the circuit placements during timing closure, allowing circuit optimizations to assess and measure the viability of cell changes. Such methods are crucial in helping prevent optimizations from creating congestion or cell overlaps which can counteract timing closure efforts.

Timing closure tools rely on a variety of estimations throughout the timing closure process, and operations in the physical placement domain also leverage this behavior. Tools use the approximations to help reduce computation complexity and decrease turn around time. During the initial phases of optimization a design will usually have a multitude of timing problems that require attention. Using estimates allows for fast optimization, and helps take down gross problems quickly. As the timing of the chip improves and the timing closure flow progresses, automated flows increase the accuracy of their estimations to ensure the tool is working on the right problems.

Placement driven synthesis provides multiple placement techniques allowing circuit transformations to repair timing violations, including estimated modes and high accuracy modes. One estimated technique is the bin-based placement model. This model divides the placement image into a collection of regions containing circuits, called bins. The bin based model allows for a fast computation of bin size and provides a mechanism to compute the relative circuit location which can be used by steiner wire calculations as a first order approximation for full chip timing. This model allows optimizations to make relatively quick decisions on whether a particular section of a chip will support an increase of physical cell size. A placement legalization Step is required after making any changes to realize the final circuit placements.

As timing closure progresses, it becomes advantageous to accurately predict the impact of placement related changes on the design. This can be achieved by restricting placement legalization and using a high accuracy incremental exact-placement model. The high accuracy placement technique available to optimizations is exact placement. In this exact placement, model the optimization insert cells into existing open-placement locations. The placements are legal and will not produce overlaps. The benefit of this technique is that the optimization can evaluate the real placements that allow measuring the timing to a high degree of accuracy. Because the method does not require legalization there are no side effects to existing logic. The drawback of that technique is that localized areas of congestion and physical image fragmentation can make it difficult to find existing open placement locations, especially for larger circuit sizes.

Figure 1A:
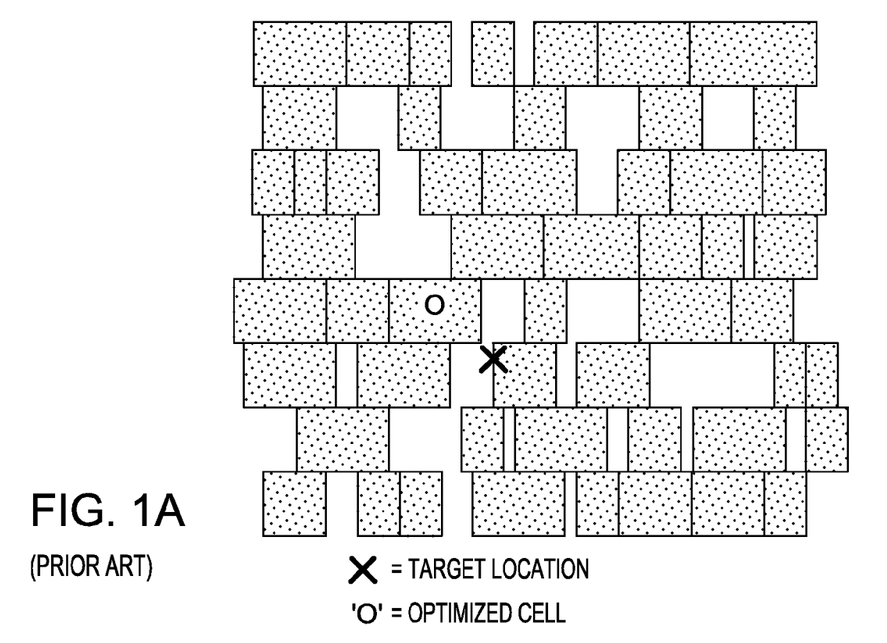
FIG. 1A is a sample physical region of a chip image along with the desired cell to be inserted into the image and the desired placement location, as known in the prior art.

FIG. 1A of the prior art illustrates a section of the chip that is under optimization using the exact placement model. In the example, the cell labeled "O" is optimized and a circuit optimization determines that a buffer is needed to repair a violation. In the illustration the "x" mark denotes the requested target placement location of the new cell, whereas the cell labeled "A" is the desired size of the open placement location.

Figure 1B:
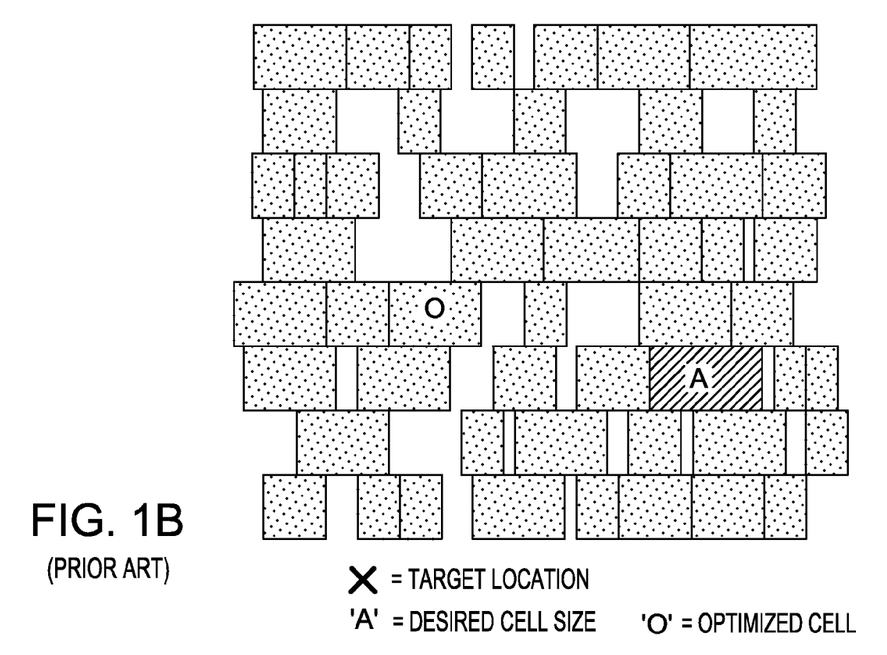
FIG. 1B is a new cell inserted into an existing open placement location, as known in the prior art.

FIG. 1B shows a prior art exemplary outcome of an optimization using an exact placement model. In the example, the placement tool was able to find an open placement location near the target location. Upon finding the open placement location, the optimization can decide whether the open placement location is suitable to repair the violation under consideration.

Although the estimated model offers a fast way to optimize circuits with consideration to the physical domain, the primary drawback of the model is that it requires circuit legalization to correct overlaps. The legalization may have deleterious effects on the critical path timing.

A drawback of the exact placement model is that it requires open space in the existing placement image for new additions or modifications within proximity to the net under optimization. The open space can be unfounded due to congestion or design fragmentation. In other scenarios, the open space may be too far outside of the wiring bounding box, causing the optimization to evaluate a free location that would otherwise fail due to electrical or timing constraints.

BRIEF DESCRIPTION OF THE DRAWINGS

Embodiments of the present invention will be understood and appreciated more fully from the following detailed description, taken in conjunction with the accompanying drawings in which.

SUMMARY

In one aspect, an embodiment enables optimizations to find open exact placement locations in a congested placement image for buffer insertion or other cell size manipulation, improving hold timing take-down while limiting side effects to critical setup slacks. The embodiment provides a seamless mechanism that allows newly inserted and/or manipulated cells to automatically displace non-critical cells.

In another aspect, an embodiment provides a timing critical placement image map, usable for optimization in which only the critical-circuit components exist in the placement image map, and are locked in place during subsequent placement image legalization.

In yet another aspect, an embodiment incorporates a combination that provides flexibility of an estimated placement model, wherein less critical logic are moved at the behest of critical paths that require the image resource along with the placement precision of the exact model for the critical logic under optimization.

In still another aspect, an embodiment provides circuit transformation optimizations to operate in congested regions of the placement image, enabling cell insertion and modifications that increase cell size that would otherwise be prohibited. At the same time, it enables optimizations to measure the high accuracy timing that is afforded by obtaining legal physical placement locations. The characteristic allows optimizations to operate on timing critical logic and make progress on difficult paths while preserving the timing of a surrounding critical logic.

In a further aspect, a method is provided for optimizing circuits having a congested placement with a timing critical placement map including: using a computer, identifying critical circuit components in a placement map and determining failing circuit components in said placement map; determining non-critical circuit components safe to be moved; removing selected non-critical circuit components from said placement map to generate a new partial placement map; optimizing said critical circuit components in said new partial placement map; and reinserting said non-critical circuit components back into said placement map.

DETAILED DESCRIPTION

In the following description, numerous specific details are set forth to provide a thorough understanding of embodiments of the present invention. However, it can be recognized that embodiments of the disclosure can be practiced without the specific details.

The timing closure flows includes a placement-driven synthesis. This type of flow is usually iterative, and the accuracy of the timing models increases as the overall chip timing improves. At the onset of placement-driven synthesis, an estimated placement model (such as bin based) is widely used, but as the timing critical paths are fully realized, the tools naturally attempt to limit design perturbation. The critical-only incremental placement model provides a continuum between the coarse placement model and the exact placement model.

The timing critical-only incremental placement model operates on a legally placed design. Like the exact placement model, it also allows optimizations to search for open placement locations, helping to ensure that critical path changes are measured precisely. However, unlike the exact placement model, the timing critical-only model alters the physical image by removing the timing non-critical cells, creating an appearance of free space and can allow progress in locally congested regions that were otherwise impossible. Further, the timing critical-only model locks timing critical cells in place. This feature ensures that the circuit modifications performed will withstand legalization and that surrounding logic does not degrade.

The timing critical-only incremental placement model is well suited for hold timing violation repairs. The hold timing closure is usually deferred until after a setup timing optimization has been performed, leaving the tool with several challenges. The setup timing closure may leave the placement image restricted or fragmented, inhibiting the hold-fail optimization from inserting or modifying the logic to repair those violations. The hold timing closure tool may also limit the introduction of new problems since the bulk of the setup timing optimization is already performed.

A hold violation repair is only an illustrative example of optimizations that can be used in which any logic optimization working with exact placement locations—as any design automation physical synthesis tool does—will benefit from that approach. By way of an example, inserting buffers or inverters on delay wires, resizing gates to larger faster gates and the like, potentially can increase the area of the design.

Moreover, the definition of what is critical logic (also referred to as critical circuit components) is flexible as well. It may be the logic having a failing slack, or it may be the logic in a highly congested region that is likely to cause disruption if an overlap is allowed. A key aspect of an embodiment of the invention is that only the non-critical logic will be allowed to move once the optimization has been completed and the overlaps are resolved. This approach works to minimize any negative impact to the non-critical logic that was not included in the incremental placement model. To do this, it can leverage well known methods of smooth spreading to ameliorate any overlaps created by the incremental critical-only model.

Figure 2:
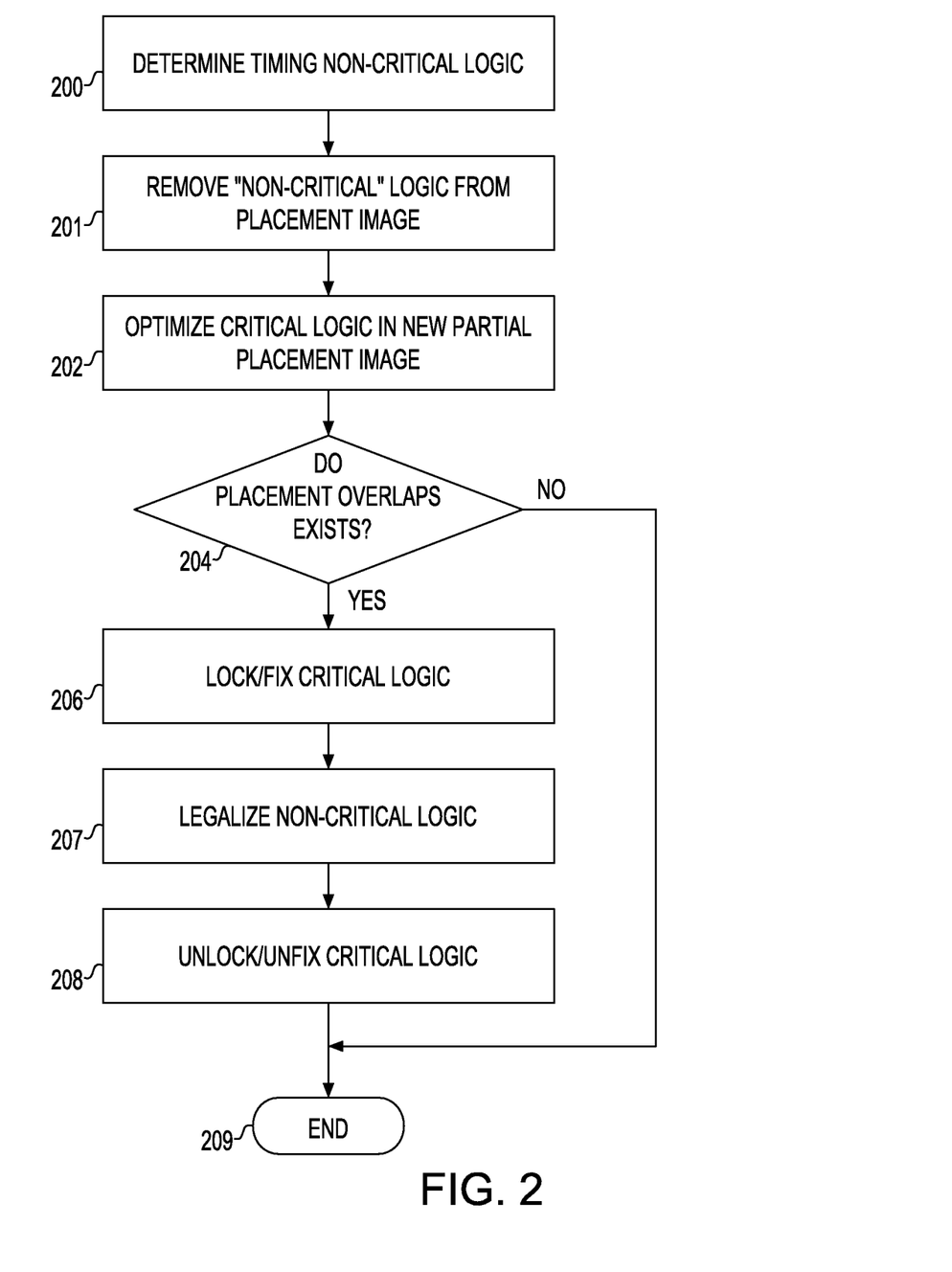
FIG. 2 is a flow chart according to one embodiment of the invention.

Referring to FIG. 2, a flow chart is described according to one embodiment. In Step 200, the flow chart identifies timing non-critical logic that can be moved to repair existing violations. The timing non-critical gate refers to a circuit in which a change to its physical placement will not degrade the timing below an acceptable threshold or introduce a new timing violation. One or several criterion can be used to determine the non-critical aspect of a gate including setup slack, hold slack, slew, capacitance, and the like. The circuit timing can be measured against a threshold value which can be further adjusted by increasing or decreasing the set of non-critical candidates.

Figure 3A:
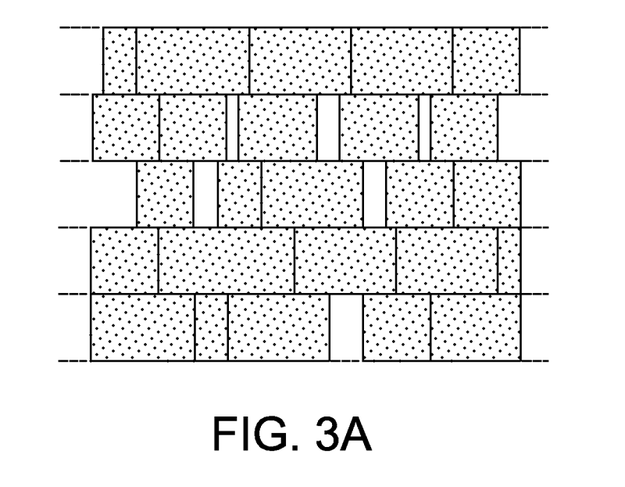
FIG. 3A is a visual representation of the placement image prior to Step 206 in an embodiment of the invention.
Figure 3B:
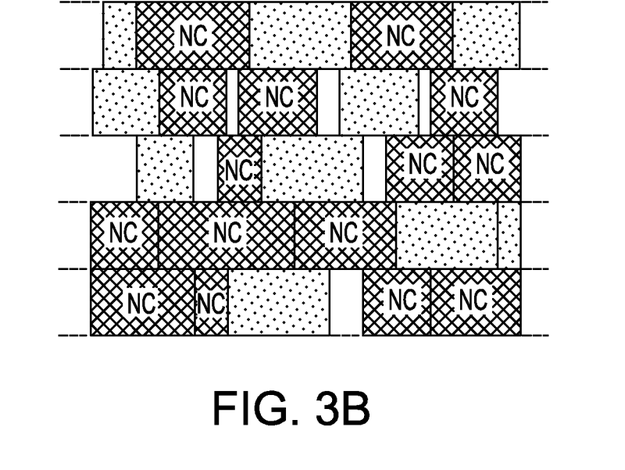
FIG. 3B is a visual representation of the placement image after Step 206 in an embodiment of the invention. The cells labeled "NC" are non-critical.

FIG. 3A illustrates an example of an initial placement image, and FIG. 3B depicts the same image after identification of the non-critical cells. Upon determining the set of timing non-critical gates in the cell image, Step 201 temporarily removes the non-critical cells from the exact placement image. This step does not change the placement of the circuits, instead it simply removes them from the placement image, creating the appearance of a free space that, otherwise, may not be present to the optimization.

Figure 3C:
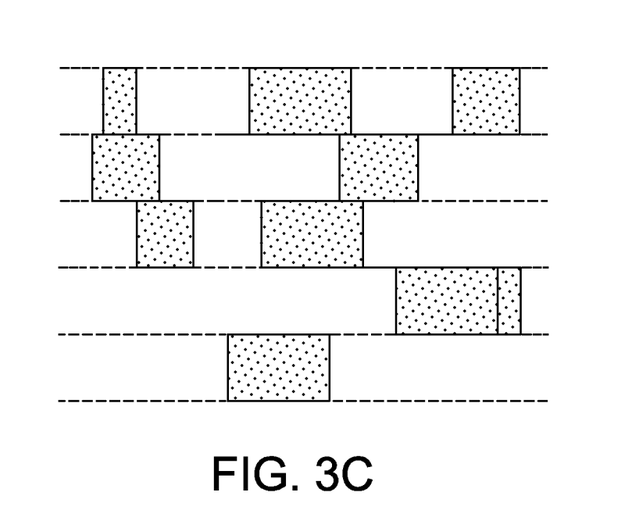
FIG. 3C is a visual representation of the placement image after Step 207 in an embodiment of the invention.

FIG. 3C is a visual representation of the circuit image following Step 201 and represents a view of the placement image seen during optimization. Step 202 proceeds with the optimization of any failing gates using the exact placement model. Because non-critical gates were removed from the placement image, the optimization can find and use placement resources that previously were not available.

Figure 3D:
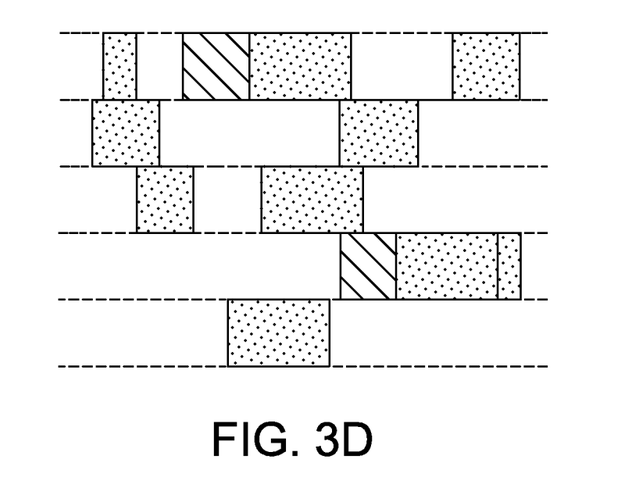
FIG. 3D is a visual representation of the placement image after Step 208 in an embodiment of the invention.

Referring to FIG. 3D, a post-optimization takes place after two circuits were inserted into the image with exact placements. Upon completion of the optimization, in Step 203, the non-critical circuits that were removed from the placement image are reinstated.

Figure 3E:
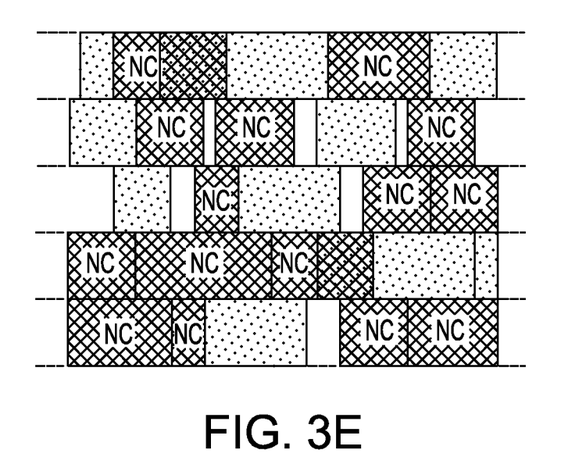
FIG. 3E is an exemplary visual representation of the placement image after Step 209 in an embodiment of the invention.

Referring to FIG. 3E, a further example is shown that illustrates two placement overlaps that were created in the circuit optimization in Step 202. Step 204 checks and determines whether any placement overlaps exists. If there are no placement overlaps, the program proceeds to Step 205.

To resolve the placement overlaps, Step 206 locks the cell placement of all critical logic in the chip image. A critical circuit is a set of all other circuits not in the set of non-critical circuits as identified in Step 200. Locking the critical logic prevents future placement legalization from changing the placements of the circuits, ensuring that their timing does not degrade. New cells added by Step 206 are also present in the placement image, and are, therefore, in the set of the critical cells and their placements are legal.

Step 207 initiates the process of legalizing the placement image. Placement algorithms can be applied to resolve the overlaps, preferably by way of smooth-spreading techniques that minimize the magnitude of individual cell displacements.

Figure 3F:
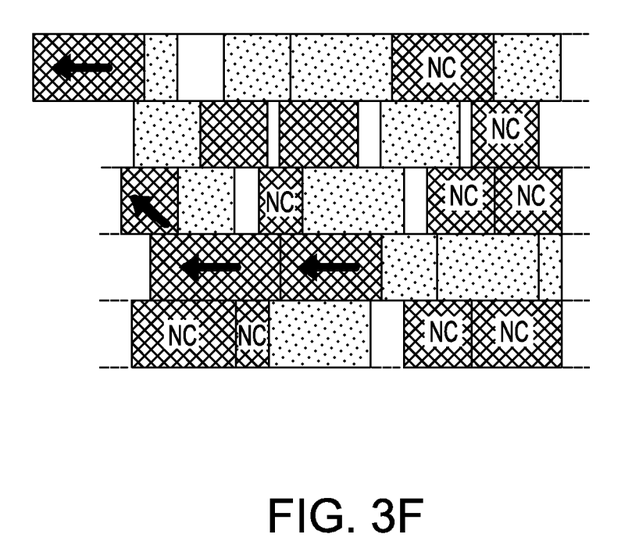
FIG. 3F is an exemplary visual representation of the placement image after Step 213 in an embodiment of the invention.

Referring to FIG. 3F, an example is illustrated of the non-critical cell movement that can occur during the legalization process. Step 208 restores the original placement characteristics of the cell by removing any cell locks or fix-in-place directives that were applied by Step 206. Step 209 terminates the process.

Figure 4:
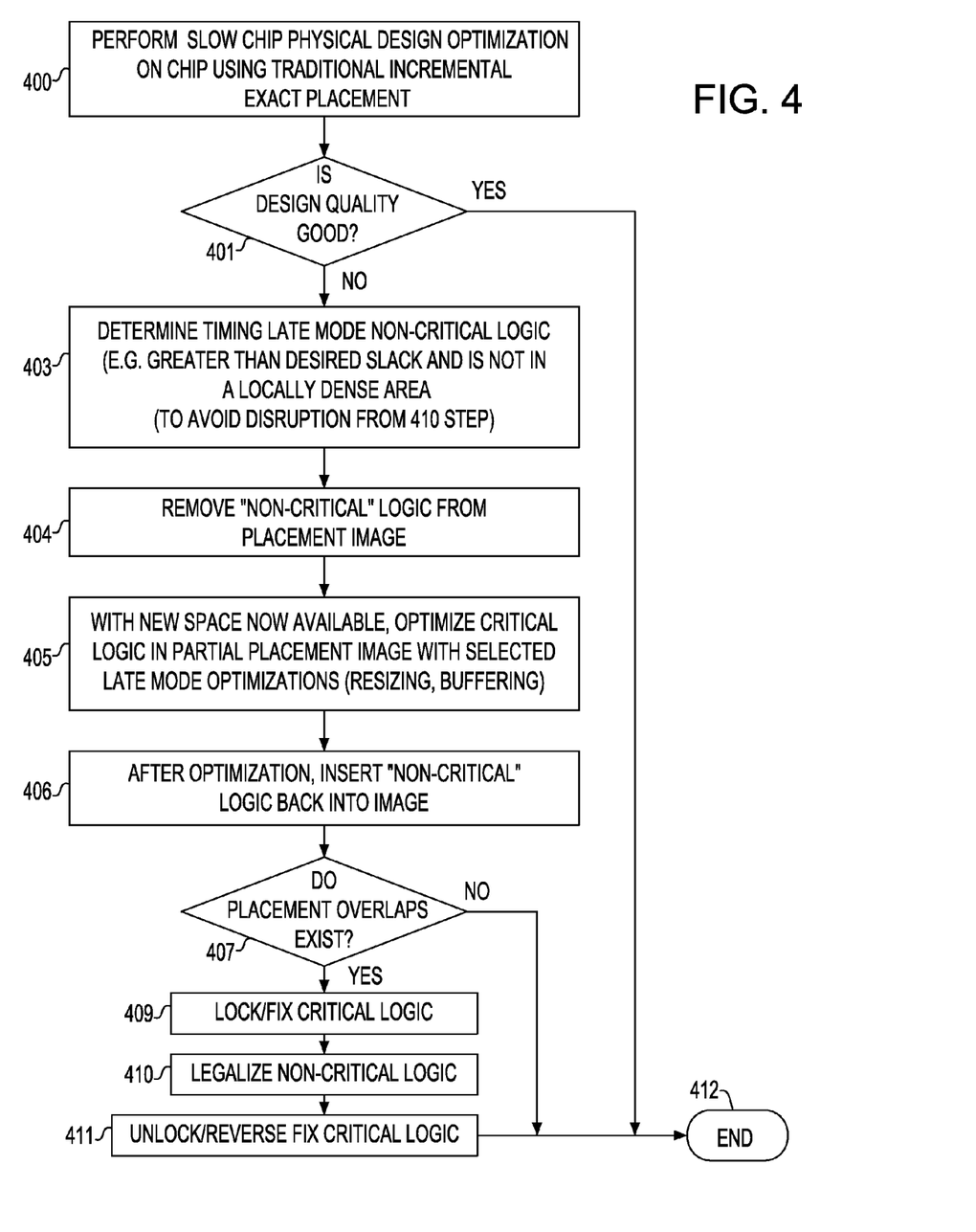
FIG. 4 is a flow chart according to one embodiment of the invention as it pertains to a late timing optimization.

Referring to FIG. 4, flow chart 400 illustrates a slow chip design optimization of a chip using an incremental exact placement. Step 401 determines whether the design is of good quality. In the example, a design is deem to be of good quality when the slacks meet or exceed a late slack threshold, i.e., which is the metric under optimization. Branching to a decision block follows. If the response is 'Yes', the flow chart branches to Step 412, i.e., to the END. If the answer is 'No', it branches to Step 403, wherein the timing late mode non-critical logic is identified, e.g., having a slack greater than the desired slack and further that is not in a locally dense area. In Step 404, any non-critical logic is removed from the placement. Step 405 illustrates a new space that is now available, allowing optimizing critical logic in a partial placement image with a selected late mode optimization that includes, for example, resizing and/or buffering.

Next, Step 406 shows the optimization completed, and the non-critical logic returns to the image map. In Step 407, a decision determines whether placement overlaps exist. Referring to the decision block, if the answer is 'No', the task is completed and the flow chart terminates (END). Otherwise, in Step 409, a lock/fix of the critical logic is put in place, and is followed by Step 410, wherein the non-critical logic is legalized. Next, it branches to Step 411 in which the critical logic is unlocked/reverse fix. In Step 412, the optimization terminates.

Figure 5:
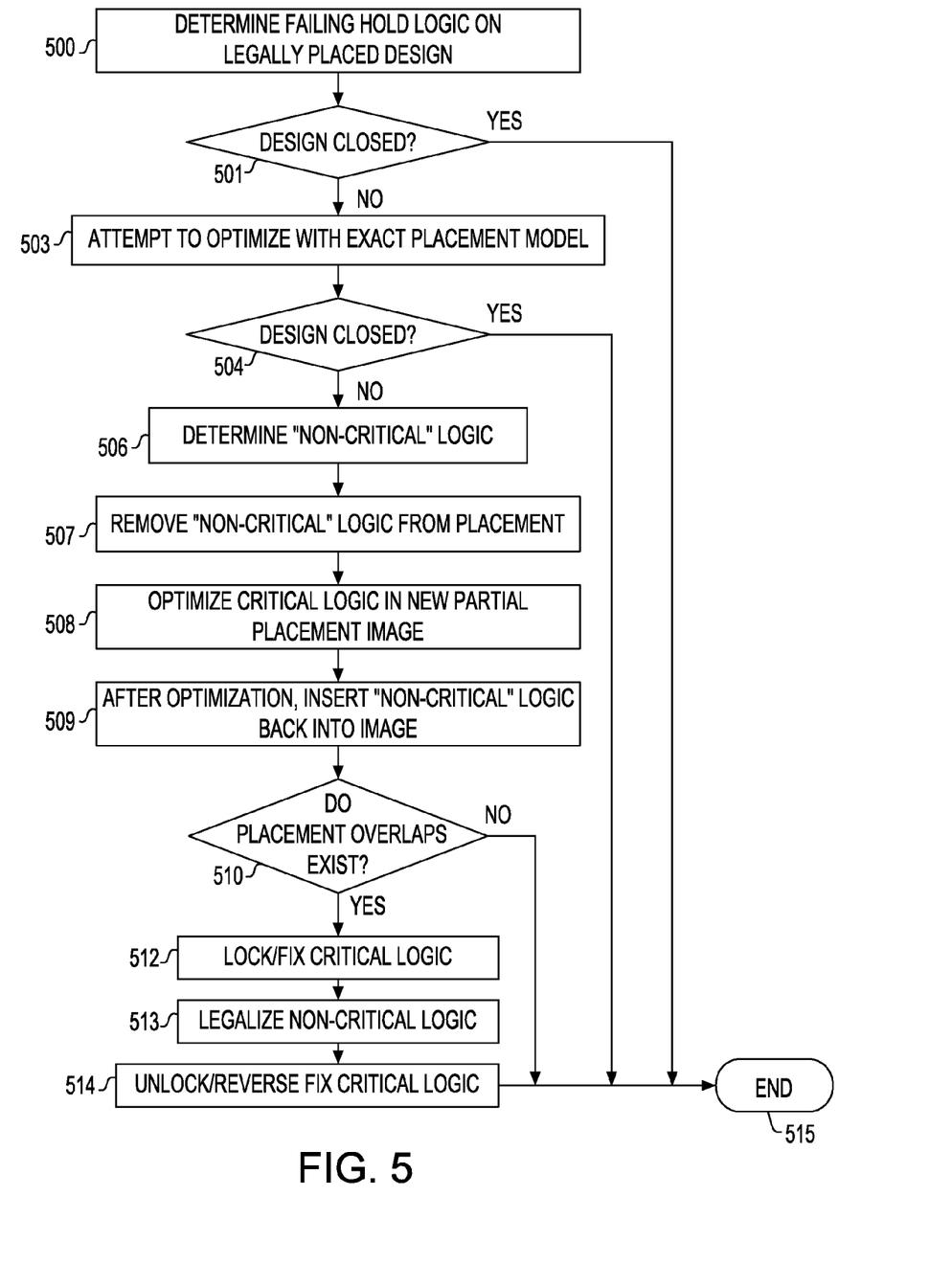
FIG. 5 is a flow chart according to one embodiment of the invention as it pertains to repairing hold timing violations.

Referring now to FIG. 5, an exemplary embodiment pertaining to the hold violation repairs is illustrated. Referring to the diagram, Steps 500-505 make a first attempt to resolve the hold violations without perturbation before proceeding to Step 506 which may introduce minimal perturbation. Step 500 initiates by checking the design for the worst hold slack. It is advantageous for the placement image at that Step to be fully realized with each cell in the design having legal placements, which allows an accurate measurement of chip timing and successive circuit optimization. Step 501 checks and determines whether the worst hold slack exceeds a user specified threshold. If the logic is greater than the threshold of failure, then the flow terminates by proceeding to Step 502. If slack violations do exist below the threshold, then the flow advances to Step 503.

In Step 503, the optimization repairs the design using the exact placement model. In the model, the hold repair optimizations can find existing open placement locations for new or pre-existing logic, making it possible for the tool to perform circuit change without disturbing the existing logic. A benefit of the present strategy is that the surrounding logic does not move, thereby preserving its timing. Step 504 again checks to determine whether the previous optimizations are closed on the hold failures. If the design is indeed closed, then the optimization proceeds to Step 505, ending the optimizations. Otherwise, if any hold violations still remain, the flow advances to Step 506. In this Step, the flow identifies the non-critical logic that can be displaced to allow for the repair to hold violations. (Note: the critical logic includes circuits in which a change to its physical placement can degrade the timing but the delta in slack will still be above an acceptable threshold or does not introduce a new timing violation). One or several criteria may be used to determine the non-critical aspect of a gate including, setup slack, hold slack, slew, capacitance, and the like. The circuit timing can be measured against a threshold value which can be further adjusted to increase or to decrease the set of non-critical candidates. Upon determining the set of timing non-critical gates in the cell image, Step 507 temporarily removes them from the exact placement image. This step does not alter the placement of the circuits, instead it simply removes them from the placement image, creating the appearance of free space that otherwise would not be present during the optimization.

Referring back to FIG. 3C, a visual representation illustrates the circuit image following Step 507, i.e., a view of the placement image as seen during optimization by the exact placement model. Step 508 proceeds with the optimization of any failing gates using the exact placement model. Since non-critical gates were removed from the placement image, the optimization will find and use placement resources that were previously not available.

Referring now back to FIG. 3D, the post-optimization illustrates following two circuits having been inserted in the image in exact placements. Upon completing the optimization, Step 509 reinstates the non-critical circuits that were removed from the placement image.

Referring back to FIG. 3E, two placement overlaps that were created during circuit optimizations previously described in Step 508 are illustrated. Step 510 checks to determine whether placement overlaps exists. If no placement overlaps are present, the program proceeds to Step 511. To resolve the placement overlaps, Step 512 locks or fixes-in-place the cell placement of all the critical logic in the chip image, the critical circuit being the set of all the other circuits not in the set of non-critical circuits as previously identified in Step 506. In Step 513, locking the critical logic prevents the future placement legalization from changing the placements of the circuits, thereby ensuring that their timing will not degrade. New cells inserted into the placement image are also in the set of critical cells, their placements being legal.

Step 513 initiates the process of legalizing the placement image. It is at this phase that placement algorithms can be applied to resolve overlaps, preferably through the use of smooth-spreading techniques that minimize the magnitude of individual cell displacements. FIG. 3F is an example of the non-critical cell movement occurring during the legalization phase.

Step 514 restores the original placement characteristics of the cell by removing any cell locks or fixing-in-place directives that were applied at Step 512. Finally, Step 515 brings the flow to an END.

Embodiments of the present invention provide a method of enabling the optimization of circuits in a physically blocked or congested placement image while preserving the existing placements of timing critical circuits. More specifically it is a method of inserting or modifying circuits by inserting at exact placement locations in the presence of interference or congestion.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed:

1. A method for optimizing circuits with a timing critical placement map comprising:
    using a computer,
    determining non-critical circuit components safe to be moved, wherein non-critical circuit components are circuits in which a change to its physical placement will not degrade the timing below an acceptable threshold or introduce a new timing violation;
    removing all non-critical circuit components from said timing critical placement map to generate a new partial placement map;
    optimizing critical circuit components in said new partial placement map free of all of said non-critical circuit components wherein said critical circuit components are a set of circuit components that are not non-critical circuit components;
    inserting new circuit components into said new partial placement map;
    reinserting all of said non-critical circuit components that were previously removed from said timing critical placement map into said new partial placement map;
    locking and fixing the critical circuit components, said critical circuit components include the inserted new circuit components;
    legalizing said non-critical circuit components which are unlocked while the critical circuit components are locked, the locking of the critical components prevents the legalizing step from changing the placements of the critical circuit components; and
    unlocking and reverse fixing the critical circuit components.

2. The method of claim 1 wherein said optimization is performed by circuit transformation operating in congested regions of said placement map enabling cell insertion and modifications that increase a cell size.

3. The method of claim 2 further comprising operating on timing said critical circuit components and on difficult paths while preserving said timings surrounding said critical circuit components.

4. The method of claim 1 further comprising:
    finding open exact placement locations in a congested placement map free of all of the non-critical circuit components for buffer insertion or cell size manipulation;
    improving hold timing take-down while limiting side effects to critical setup slacks; and
    creating a seamless mechanism allowing newly inserted and manipulated cells to automatically displace non-critical cells.

5. The method of claim 1 further comprises providing a timing critical placement image map for said optimization.

6. The method of claim 5 wherein said timing critical image map enables said critical-circuit components present in said placement image map remain locked in place during subsequent placement image legalizations.

7. The method of claim 1 further comprising incorporating a combination that provides flexibility for an estimated placement model.

8. The method of claim 1, wherein timing a critical-only incremental placement model puts a hold on a timing violation repair, said hold timing closure being deferred until after setup timing optimization is performed.

9. The method of claim 1, wherein setup timing closures restricts or fragments said placement map, and wherein said hold inhibits said optimization from inserting or modifying said failing circuit components in said placement map to repair violations.

10. The method of claim 1, wherein less critical circuit components are moved at behest of critical paths requiring image resource and placement precision of an exact model for said critical circuit components under optimization.

11. The method of claim 10, further comprising enabling said optimizations determine an accurate timing that is afforded by obtaining legal physical placement locations.

12. The method of claim 1 wherein circuit transformation optimizations operate in congested regions of said placement image map, enabling cell insertion and modifications that increase cell size which will otherwise be prohibited due to placement constraints.

13. The method of claim 12, wherein said circuit transformation optimizations operate on said timing critical circuit components and progress on difficult paths.

14. The method of claim 12 wherein said optimizing is performed while preserving the timing of surrounding said critical circuit components.

15. The method of claim 1 further comprising legalizing said placement images by resolving overlaps.

16. The method of claim 1 wherein said legalizing is achieved using smooth-spreading techniques for minimizing magnitudes of individual cell displacements.

17. The method of claim 1 further comprising locking cell placements of all of said critical circuit components in a chip image, wherein a critical circuit includes all other circuits not encountered in said set of non-critical circuits.

18. The method of claim 17 wherein said locking said cell placements of said critical circuit components prevents future legalizations from changing the cell placements of said circuits ensuring that their timing does not degrade, and wherein new cells inserted into said placement map are also in said set of critical cells.

19. The method of claim 17 further comprising restoring original placement characteristics of said cells by removing any of said cell locks or fix-in-place directives previously applied.

20. A non-transitory storage medium for storing optimized circuits with a timing critical placement map storing instructions for executing by a processing circuit for performing a method comprising:
    determining non-critical circuit components safe to be moved, wherein non-critical circuit components are circuits in which a change to its physical placement will not degrade the timing below an acceptable threshold or introduce a new timing violation;
    removing all non-critical circuit components from said timing critical placement map to generate a new partial placement map;
    optimizing critical circuit components in said new partial placement map free of all of said non-critical circuit components wherein said critical circuit components are a set of circuit components that are not non-critical circuit components;
    inserting new circuit components into said new partial placement map; and reinserting all of said non-critical circuit components that were previously removed from said timing critical placement map into said new partial placement map;

locking and fixing the critical circuit components, said critical circuit components include the inserted new circuit components;

legalizing said non-critical circuit components which are unlocked while the critical circuit components are locked, the locking of the critical components prevents the legalizing step from changing the placements of the critical circuit components; and unlocking and reverse fixing the critical circuit components.

\* \* \* \* \*